April 23, 1935.   R. W. SPAKE   1,998,944
BROILER PAN AND PLATTER
Filed May 16, 1934
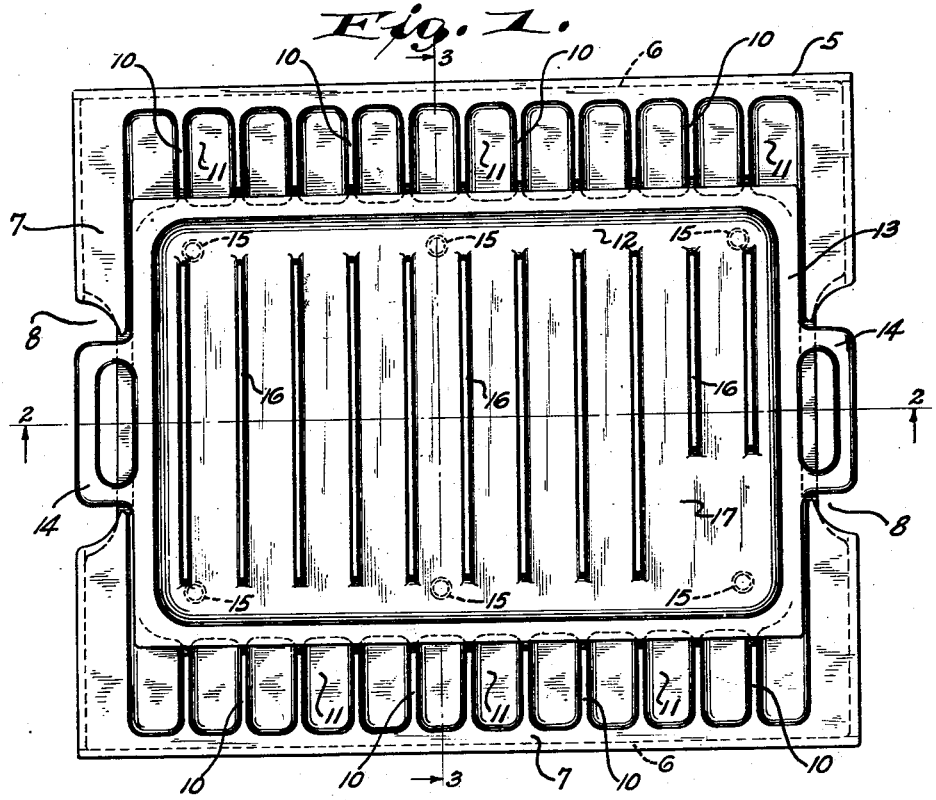
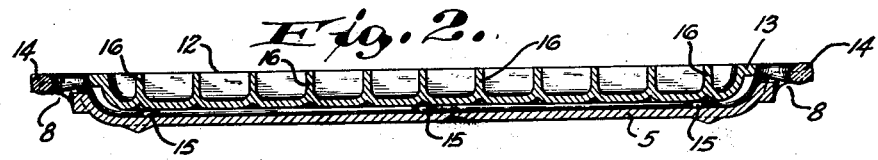
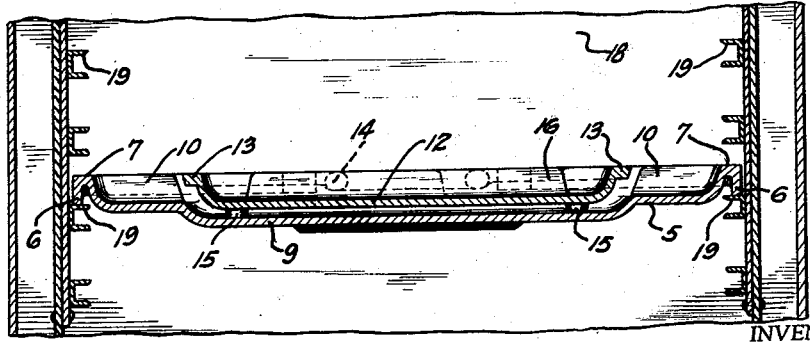
INVENTOR.
Richard W. Spake,
BY Morsell, Lieber & Morsell
ATTORNEYS.

Patented Apr. 23, 1935

1,998,944

UNITED STATES PATENT OFFICE 1,998,944

BROILER PAN AND PLATTER

Richard W. Spake, Quincy, Ill.

Application May 16, 1934, Serial No. 725,927

6 Claims. (Cl. 53—5)

This invention relates to improvements in combination broiler pan, broiler rack and platter, particularly adapted for use in conjunction with the standard broiler compartment of a cooking range.

The broiler compartment of a cooking range is fitted with interior side rails on which a broiler pan is slidably mounted. Heretofore a broiler pan has had but a single function and consisted of a shallow pan member on which a wire rack or grill was removably mounted. In the broiling of meat, the meat was placed on the wire grill and the juices from the meat would drip into the pan. When the meat was ready for serving it was necessary to remove the meat from the grill and place it on a separate platter, and then, if the juices were to be utilized, it was necessary to remove the grill and pan from the compartment and pour the juices onto the meat on the separate platter.

This form of construction, therefore, has serious objections in that considerable handling of the meat, grill and pan is required, it is necessary to provide a separate serving platter for the meat, it is difficult to utilize all of the meat juices, and cleaning and washing of the broiler pan and rack is difficult.

It is, therefore, the primary object of the present invention to eliminate the above objections and difficulties by providing a combination broiler pan, rack and platter wherein the meat is disposed on a separable unit of the device which functions as a rack and which is readily removed from the pan and can be used as a serving platter with the meat thereon and conserving the juices.

A further object of the invention is to provide a combination broiler device of the character described having broiling rack ridges cast thereon as integral parts of the pan and platter.

A further object of the invention is to provide a combination broiler device of the character described so constructed as to permit and facilitate preheating of the pan and arranged so that heat will be reflected to the meat disposed thereon to hasten the broiling of the meat and to aid broiling from the under-surface as well as the top surface of the meat.

A further object of the invention is to provide a combination broiler pan, rack and platter, which is of very simple construction, is neat and attractive in appearance, is inexpensive to manufacture, is strong and durable, and is well adapted for the purposes set forth.

With the above and other objects in view the invention consists of the improved combination broiler pan, rack and platter, and its parts and combinations as set forth in the claims, and all equivalents thereof.

In the accompanying drawing in which the same reference characters indicate the same parts in all of the views:

Fig. 1 is a plan view of the improved combination broiler pan, broiler rack and platter;

Fig. 2 is a longitudinal sectional view thereof taken on line 2—2 of Fig. 1; and Fig. 3 is a transverse vertical sectional view through a cooking range broiler compartment and the improved broiler pan, rack and platter therein.

Referring now more particularly to the accompanying drawing it will appear that the device includes a rectangular open top, shallow pan 5 having depending flanges 6 along its side edges. The top portion of the pan is also provided with an annular horizontal flange 7, which is cut away at its intermediate forward and rear portions, as at 8, to form platter handle clearances.

The bottom of the pan is formed with a depressed area 9 extending from the rear to the front, but spaced inwardly from the sides of the pan. The inner surface of said area 9 is plane, while the raised side areas thereadjacent have spaced-apart, transversely extending ribs or fins 10, providing pockets 11 therebetween.

Adapted to seat within the depressed area 9, is a removable rectangular platter 12, the upper portion thereof being surrounded by a peripheral horizontal flange 13. The bottom of said platter is provided with spaced feet 15 resting on the pan portion 9 and the platter is of a depth so that the plane of its top surface portions is in the plane of the top surface portions of the pan 5. Also, the side flanges 13 of the platter are adjacent the inner ends of the pan ribs 10, while the front and rear flanges 13 abut against the inner edges of the front and rear flanges 7 of the pan. Extending outwardly from the front and rear flanges of the platter are handles 14 which extend into the clearances 8.

Cast on the top surface of the bottom portion of the platter are spaced, transverse, upstanding ribs 16. All of the ribs terminate short of both sides of the platter, while several adjacent ribs are of shorter length to provide an unobstructed liquid collecting pocket 17. It is preferred that the entire device be formed of aluminum to facilitate lightness and economy and because of the rapid heat transfer qualities of aluminum.

By reference to Fig. 3 of the drawing it will be observed that the broiling compartment of a cooking range is indicated generally by the numeral 18. Secured to opposite inner side walls of this compartment are the usual series of broiler pan supporting rails 19. The improved combination device is adapted to be slidably mounted on a pair of said rails and as shown the depending side flanges 6 of the pan 5 rest on a pair of opposite rails, whereby the device may be slidably moved on the rails into and out of the compartment. As thus mounted, the handles 14 of the platter are at the front and rear ends of the device.

In use it is desirable, although not necessary, to pre-heat the pan and platter within the broiling compartment. The meat to be broiled is then placed on the combined pan and platter as centrally as is possible and resting on the ribs. During the broiling, juices from the meat will drip into the platter and when the broiling is completed the platter unit may be removed bodily from the pan and it is utilized as the serving platter for the meat, thereby eliminating transfer of the meat and juices. If any juice dripped into the pockets 11 of the pan, said juice can be drained into the unobstructed depressed central portion of the pan. Cleaning of the device is simple and the meat may be quickly served, and broiling is facilitated.

From the foregoing description it will be seen that the improved combination broiler pan, broiler rack, and platter, is of simple and novel construction, and is well adapted for the purposes set forth.

What is claimed as the invention is:

1. A broiling receptacle, comprising a pan having a flat portion and a ribbed portion laterally thereof, and a platter member formed with ribs and removably seated within the flat portion of the pan.

2. A combination broiling receptacle, comprising a pan member, and a smaller platter member removably mounted therewithin, the pan member and the platter member both being formed with upwardly projecting ribs, the ribs of each member being integral with their respective members.

3. A combination broiling receptacle, comprising a pan member, and a smaller platter member removably mounted therewithin, the pan member and the platter member both being formed with upwardly projecting ribs, and the ribs of the platter member being alined with the ribs of the pan member.

4. A combination broiling receptacle, comprising an aluminum pan member, and a smaller aluminum platter member removably mounted within the pan member entirely within the planes of the surfaces thereof, said members both being formed with integral, upstanding ribs.

5. A combination broiling receptacle, comprising a pan member having recesses at opposite margins thereof, a narrower platter member removably mounted within the pan member, and handles at the ends of said platter member located within said pan marginal recesses, the pan and platter members both being formed with ribs.

6. A combination broiling receptacle, comprising an aluminum pan having a flat portion and a ribbed portion laterally thereof, a pair of opposite margins of the flat portion being recessed, a narrower aluminum platter member removably mounted within the flat portion of the pan and having ribs alined with the ribs of the pan, and handles at the ends of the platter and located within said pan marginal recesses.

RICHARD W. SPAKE